June 27, 1972 W. G. DARLAND, JR 3,672,998

EXTENDED AREA ZINC ANODE HAVING LOW DENSITY FOR USE IN A HIGH RATE ALKALINE GALVANIC CELL

Filed Dec. 5, 1969 6 Sheets-Sheet 1

INVENTOR.
WILLIAM G. DARLAND, JR.
BY
ATTORNEY

*INVENTOR.*
WILLIAM G. DARLAND, JR.
BY
*ATTORNEY*

INVENTOR.
WILLIAM G. DARLAND. JR.
BY
ATTORNEY

INVENTOR.
WILLIAM G. DARLAND, JR.
BY
ATTORNEY

INVENTOR.
WILLIAM G. DARLAND, JR.
BY
ATTORNEY

INVENTOR
WILLIAM G.DARLAND,JR.
BY
ATTORNEY

United States Patent Office 3,672,998

Patented June 27, 1972

3,672,998

EXTENDED AREA ZINC ANODE HAVING LOW DENSITY FOR USE IN A HIGH RATE ALKALINE GALVANIC CELL

William G. Darland, Jr., Parma, Ohio, assignor to Union Carbide Corporation, New York, N.Y.

Continuation-in-part of application Ser. No. 738,474, Jan. 20, 1968, which is a continuation-in-part of application Ser. No. 612,645, Jan. 30, 1967. This application Dec. 5, 1969, Ser. No. 882,714

Int. Cl. H01m 41/00

U.S. Cl. 136—30 16 Claims

ABSTRACT OF THE DISCLOSURE

For use in a high rate alkaline galvanic cell, an extended area anode compact is provided composed of elongated forms of zinc such as zinc fibers or wool, in pressure-formed, multipoint physical contact throughout the body of the anode compact. The anode compact may also be formed from fabricated metal such as expanded zinc metal or screen. In forming the anode compact, the zinc fibers, wool or expanded zinc metal is compression molded to a controlled low bulk density of below 2.5 grams per cubic centimeter. To attain reasonably high electrode efficiencies on the order of 70% of theoretical and above at electrical current drains of about 250 amperes per square foot, the anode compact is formed to a low bulk density of from about 1 to 1.75 and preferably from about 1 to 1.50 grams per cubic centimeter. Optimum electrode efficiencies are attained if the bulk density of the anode compact is maintained within the range of from about 1.0 to 1.25 grams per cubic centimeter. Suitable means are provided in the cell employing the anode compact for maintaining its internal temperature at least at a minimum operating temperature required to discharge the cell at high current densities.

This application is a continuation-in-part of my earlier copending application Ser. No. 738,474, filed on June 20, 1968, now abandoned, which is in turn a continuation-in-part of my earlier copending application Ser. No. 612,645, filed on Jan. 30, 1967, now abandoned.

This invention relates to high rate alkaline galvanic cells of the type employing a zinc anode and more especially concerns an extended area zinc anode for use in such cells. More particularly, the invention concerns a novel and improved extended area anode compact having a controlled bulk density for improved electrode performance.

Alkaline galvanic cells of various systems are well-known in the art. In recent years, they have undergone extensive investigation as possible power sources for use in many new battery applications. While many different alkaline galvanic cell systems are known, some of the most practical employ a zinc anode. Considerable research has been devoted to this type of alkaline galvanic cell with a particular view toward improving its capacity for delivering large quantities of electrical current. In particular, there is a present need for a high rate alkaline galvanic cell of the type utilizing a zinc anode which is capable of operating at extremely high current densities of the order of about at least 250 amperes per square foot of nominal anode surface area.

It is known that in order to attain high current densities from an alkaline galvanic cell employing a zinc anode, the anode surface must be developed or in some way extended so as to provide as large an anode surface area as possible. This requirement is also necessary in order to avoid the detrimental effects of zinc passivation within the alkaline electrolyte.

Various types of extended area anodes have been devised such as the conventional anode gel wherein particles of zinc are suspended within a gelled medium such as carboxymethyl cellulose, for example. Another well known type is the so-called "pressed powder electrode." Anodes of this type consist of compressed zinc powders usually supported on a conductive carrier grid. These anodes have been formed under substantially high pressures in order to produce a dense but porous electrode. Normally, when forming the electrode, the zinc powders have been compressed or molded to a density of at least about 2.5 grams/cc. in order to attain the interparticle contact necessary for good electronic conductivity. Unfortunately, these known types of extended area anodes have not proven capable of efficient electrochemical utilization of the available zinc when operated at the high current densities which are desired for many present-day battery applications.

It is a general object of this invention to provide a novel and improved extended area zinc anode for use in a high rate alkaline galvanic cell.

A more specific object is to provide a novel and improved extended area anode compact which is formed to a controlled bulk density for improved electrode performance.

Still another object is to provide a novel and improved extended area anode compact which is characterized in that maximum electrochemical utilization of available zinc is achieved at high current densities of the order of about at least 250 amperes per square foot of nominal anode surface area.

The foregoing and other related objects, features and advantages of the invention will be more fully understood as the description thereof proceeds especially when taken together with the accompanying drawings in which.

Figure 1:
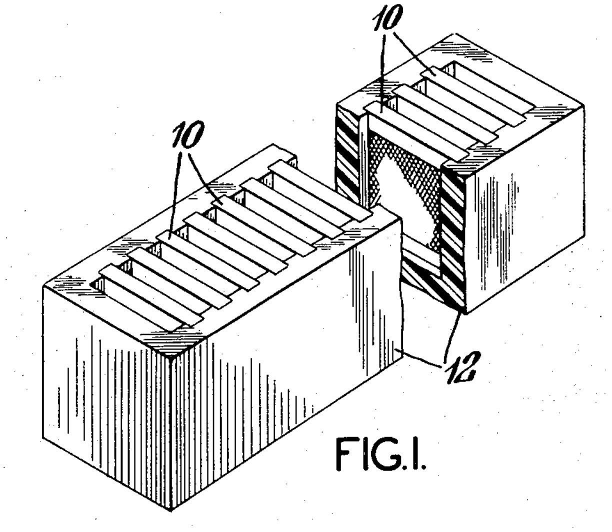
FIG. 1 is a perspective cut-away view of a typical battery of high rate alkaline galvanic cells embodying the invention.

In the practice of the invention, an extended area anode compact is made by compression molding various elongated forms of zinc such as fibrous zinc and fabricated metal. For most applications, the anode compact is formed into the shape of a flat plate electrode.

Elongated forms of zinc, i.e., those in which the length is greater than the width or diameter thereof, offer many advantages for forming an anode compact in accordance with the invention. First of all, they possess an extended surface area. Moreover, elongated zinc forms are capable of being pressure-formed in intimate physical contact with one another at many points throughout the anode body. Spherical forms such as zinc powders, for example, when compacted to form an anode, do not asreadily make multipoint contact with neighboring particles and may even become cohesively bonded or fused together, thus reducing the effective surface area. Furthermore, elongated zinc forms due to their particular configuration can be pressure-formed to a controlled low bulk density.

Included particularly within the practice of the invention are elongated zinc forms such as zinc fibers, wool, thread, wire and the like. Fabricated metal such as zinc mesh and other types of open grids because their basic structure is composed of elongated zinc strands are also included. Among the fabricated metals which can be used are expanded zinc metal or screen. Other types of fabricated metal that may be useful in the practice of the invention are sliced honeycomb, metal lath and "greater" type pierced metal. The preferred fabricated metal for use in the invention is expanded metal of substantially pure zinc or alloys thereof.

The fibrous zinc that is used to form the anode compact of the invention may be any conventionally produced zinc fiber such as mechanically formed fibers, e.g., those made from a large zinc billet by metal turning techniques. Electrolytically formed zinc fibers such as dendritic zinc may also be used. When the anode compact is made from fibrous zinc, it is preferred to employ the zinc fibers together with a suitable carrier material. The carrier material should be an open mesh, grid or screen and preferably is made of zinc. Any of the aforementioned fabricated metals may be used as the carrier material, such as expanded zinc metal, for example. In forming the anode compact, the fibrous zinc may be compression molded onto one or both sides of a single sheet of the carrier material. Various forms of the carrier material may be used, for instance, a sheath may be formed by folding a sheet of expanded metal into the form of an envelope and the fibrous zinc then compression molded therebetween to form the anode compact. Of course, the anode compact may also be made from the fibrous zinc alone or without the carrier material if desired. Additionally, the anode compact may be made by compression molding two or more superimposed sheets of fabricated zinc metal. Illustratively, several or more sheets of expanded zinc metal may be stacked together in a random orientation and then compressed to form the anode compact.

Unexpectedly, it has been found in accordance with the invention that an extended area anode compact may be produced with an improved electrode coulometric efficiency, i.e., percent of theoretically available ampere-hours derived from a known weight of anode material, by compression molding the anode compact to a controlled bulk density which is lower than that achieved by conventional methods in the formation of so-called "pressed powder electrodes," for example, i.e., below about 2.5 grams/cc., but which at the same time is not less than about 1 gram per cubic centimeter based on the total bulk volume of the anode compact, i.e., including the open mesh, grid or screen carrier material if used. Experimentation has shown that there is a distinct and significant correlation between electrode coulometric efficiency and the bulk density of the thus formed anode compact, notwithstanding the fact that the thickness of the anode may be somewhat increased at lower bulk densities and the volumetric efficiency thereby reduced, and that the present anode compacts with controlled lower bulk density are far superior in performance to any conventionally produced zinc electrodes.

For the sake of conciseness, the invention will be hereinafter more particularly described with reference to an oxygen-zinc cell system. In operating this type of galvanic cell, oxygen or air is continuously fed to an activated and catalyzed carbon cathode as the depolarizing gas. It will be understood, however, that the invention is not so limited but is broadly applicable to various other electrochemical systems wherein the cathode may be any one of the common depolarizers such as manganese dioxide, silver oxide, nickel oxide, mercuric oxide, etc., as will readily occur to those skilled in the art.

Referring now to the drawings, there is shown in FIG. 1 a battery of typical high rate oxygen-zinc cells embodying the invention. The cells 10 are provided in the form of flat cell units and are mounted within an open battery container 12. As illustrated, the cells 10 are mounted in spaced apart relation within the battery container 12 in order that each cell may have free access to the oxygen-depolarizing gas. The battery container 12 may be composed of any suitable electrically nonconductive, caustic-stable material such as an epoxy or vinyl resin, for example.

Figure 2:
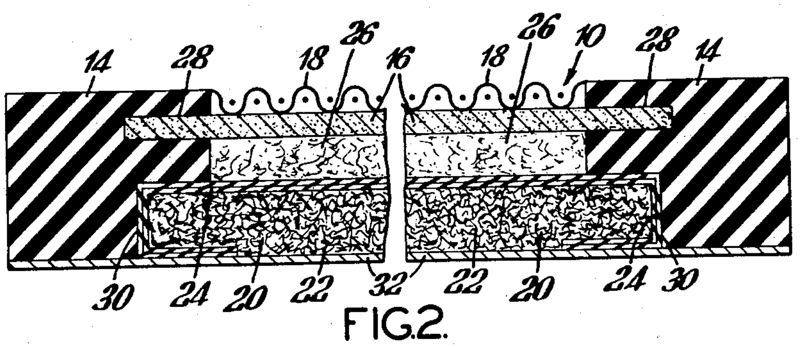
FIG. 2 is a cross-sectional view of one of the galvanic cells shown in the battery of FIG. 1.

As shown in FIG. 2, each cell 10 resides within an electrically nonconductive frame 14 which is chemically inert to the alkaline environment, epoxy, methyl methacrylate, polysulfone, and polypropylene resins having been used successfully. Within the frame 14 is disposed a flat, oxygen-depolarizable, activated and catalyzed carbon cathode 16 whose outer face is in contact with a gas-permeable current collector member 18 suitably composed of an electrically conductive mesh such as a nickel screen. Adjacent the other side of the frame 14 is an extended area anode compact 20 composed of a mass of zinc fibers 22 which are enveloped within an outer sheath of expanded zinc metal 24. Between the carbon cathode 16 and anode compact 20 is interposed a bibulous separator 26 suitably composed of a non-woven nylon fibrous material. The bibulous separator 26 is thoroughly soaked with an alkaline electrolyte, i.e., a 10 normal solution of potassium or sodium hydroxide, for example.

In order to secure the carbon cathode 16 and anode compact 20 within the cell 10, the frame 14 is provided with marginal recesses along its innermost edge for securing the outer periphery of both the cathode 16 and the anode compact 20 as indicated at 28, 30. The anode compact 20 is secured to an electrically conductive anode backing plate 32 composed of a metal which is compatible with the alkaline cell environment, suitably zinc metal, for example. The anode backing plate 32 is larger than the anode compact 20 such that its outer periphery lies flush with the surface of the frame 14, and thus serves as the other current-collector member for the cell.

The cathode 16 may be of the conventional type composed of a flat porous carbon plate which is suitably activated and catalyzed by methods already known in the art. The cathode may be treated for example in accordance with the processes disclosed in U.S. Pat. Nos. 2,615,932 and 2,669,598, such that the cathode contains within its pores and on its surfaces a spinel type catalyst ($RO \cdot Al_2O_3$) consisting of an oxide of a heavy metal (R) and of aluminum oxide.

Figure 3:
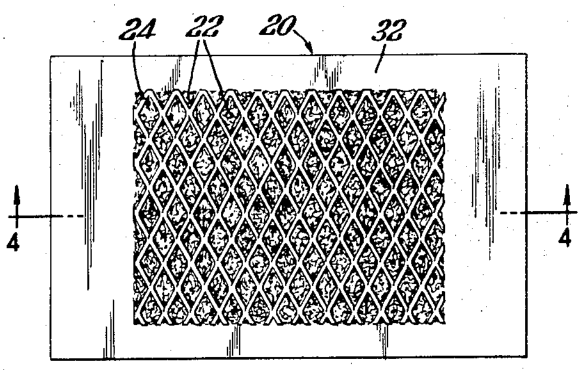
FIG. 3 is a plan view of an extended area anode compact used in the cell of FIG. 2.
Figure 4:
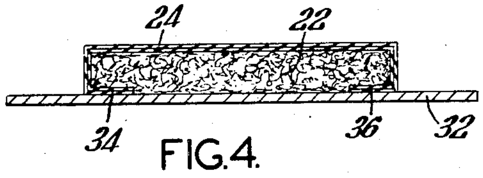
FIG. 4 is a cross-sectional view taken along the line 4—4 in FIG. 3.

FIGS. 3 and 4 show in greater detail the extended area anode compact 20 of the invention. The anode compact 20 is formed by compression molding a mass of zinc fibers 22 together with an outer sheath of expanded zinc metal 24. In the anode compact 20, the zinc fibers 22 are in pressure-formed, multipoint contact with each other and with the expanded metal 24, so that intimate contact between the fibers and the expanded metal 24 is achieved. The outer sheath of expanded metal 24 envelopes the zinc fibers 22 except at the bottom of the anode compact 20 where the fibers 22 are in contact with the anode backing plate 32. To fasten the anode compact 20 to the backing plate 32, the expanded zinc metal 24 is folded over the peripheral edge of the compacted mass of zinc fibers 22 at the bottom of the anode compact 20 and is then secured to the backing plate 32 by spot welding as indicated at 34, 36.

Figure 5:
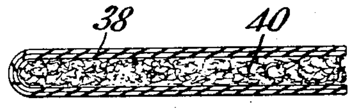
FIG. 5 is a cross-sectional view of a modified extended area anode compact of the invention.

In FIG. 5 a modification of the extended area anode compact of the invention is shown wherein an outer sheath of expanded zinc metal 38 is simply folded in a substantially U-shaped fashion and then compression molded with the zinc fibers 40 therebetween.

Figure 6:
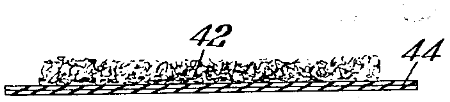
FIG. 6 is a similar view showing another modification of the invention.

FIG. 6 shows another modification of an extended area anode compact wherein a zinc fiber mat 42 is compression molded directly onto a sheet of expanded zinc metal 44. Although the expanded zinc metal 44 is preferred as a carrier grid in this simplified embodiment, it is of course possible to construct the anode compact solely of fiinc fibers compressed into the form of the fibrous mat 42.

Figure 7:
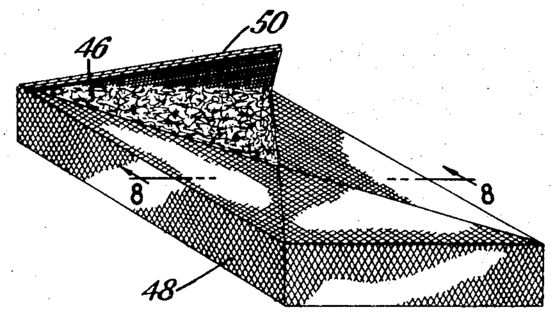
FIG. 7 is a perspective view of still another modification showing the extended area anode compact partially assembled.
Figure 8:
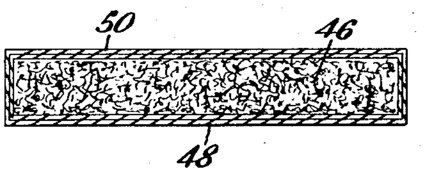
FIG. 8 is a cross-sectional view taken along the line 7—7 in FIG. 7.

A more preferred construction for the extended area anode compact of the invention is shown in FIGS. 7 and 8. In this preferred embodiment, the compact of zinc fibers 46 is completely enclosed on all sides by an outer sheath or basket of expanded zinc metal 48. In forming this anode compact, a sheet of expanded zinc metal is pre-cut with four triangularly shaped corners as at 50 which are folded over the zinc fibers 46 to form a rectangular top thereby enclosing the entire anode compact. Obviously, this construction is more preferred since there is little if any chance for the fibers to become dislodged and thereby cause a short-circuit within the cell.

Figure 9:
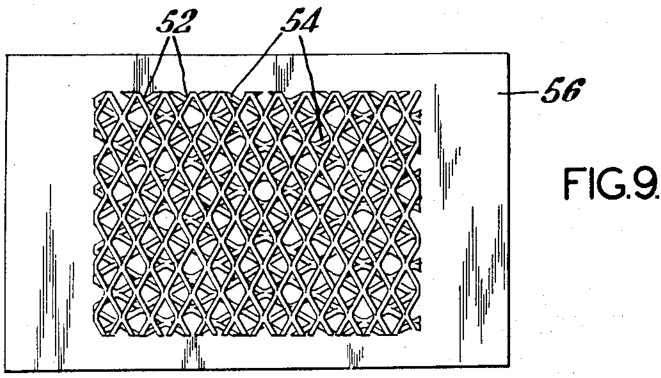
FIG. 9 is a plan view of a further modification of the extended area anode compact of the invention.

In FIG. 9 there is shown an extended area anode compact which is made entirely from expanded zinc metal. To form this anode compact, two or more sheets of expanded zinc metal 52, 54 may be superimposed upon one another in such manner that the grid structures of each are arranged in random orientation. The sheets of expanded metal 52, 54 are spot welded to each other or otherwise secured at various points and then compressed to form a composite unit structure. After the anode compact is so formed, it is placed against an anode backing plate 56 as before described and, if desired, secured thereto by suitable means such as by spot welding.

Extended area anode compacts in accordance with the invention are made by conventional compression molding techniques wherein the zinc fibers are placed in a suitable mold of the size and configuration of the anode to be formed and then subjected to a fixed pressure which is sufficient to place the fibers in pressure-formed, multipoint physical contact with one another, and thus form a self-supporting cohesive body. The particular molding pressures to be used in any given instance will of course depend on various factors such as the size and shape of the fibers, stiffness etc., but in no event should the pressures used be so high as to cause the fibers to become physically bonded or fused together along the entire length thereof. When the fabricated metal is used as a carrier grid such as in the case of a single sheet of expanded zinc metal as shown in FIG. 6, the molding pressure should also be sufficient to cause the zinc fibers to become cohesively united with one another and with the carrier grid. In an anode compact so formed, the zinc fibers are intermixed in intimate physical contact at mtny points with neighboring fibers throughout the anode body so that good electronic conductivity is achieved. It is important in the first instance to evenly but randomly distribute the zinc fibers within the compression mold before pressure is applied such that the electronic conductivity and distribution of pores will be uniform throughout the entire structure of the anode compact.

Fibrous zinc is available in many different forms and may be produced either mechanically or by electrolytic methods known in the art. Various forms of mechanically produced zinc fibers that may be used to form the anode compact include wool, lathe turnings and fibers produced from shaper or mill cuttings, for example. Electrolytic dendritic zinc may be produced by known electrodeposition techniques as disclosed for example, in U.S. Pat. No. 3,071,688 to M. B. Clark et al. Most any elongated form of zinc may be used as opposed to powder forms as before described, whether it is produced mechanically or electrolytically. Moreover, the particular form of zinc used may be of most any cross-sectional configuration, i.e., round, square or triangular and may even be of a hollow tubular shape.

Generally speaking, the particular size of the zinc form to be employed in the formation of the anode compact is not narrowly critical. When fibrous zinc is used, the fibers should not be so short as to create difficulties in handling and use of the individual fibers or to cause the fibers to become intermixed so closely that when subjected to pressure they form an excessively dense body. On the other hand, the zinc fibers should not be too long so as to preclude them from being uniformly and easily spread in the mold. It has been found that suitably the zinc fibers may range in size form about 1/4 inch to about one inch in length and from about 0.003 inch to about 0.015 inch in width (diameter or cross-sectional thickness of elongated zinc). Fibers as short as 1/16 inch have been used; however 1/4 inch is about the practical minimum length. In the case of individual fibers, a preferred length-to-diameter ratio is at least 20:1.

When using the fabricated metal, it is important that the grid or mesh size of the expanded metal, for example, be such that it possesses a large active surface area while at the same time enabling it to be readily placed in intimate contact with the fibrous zinc or other fabricated metal used to form the anode compact. Illustratively, an expanded zinc metal grid produced under the tradename of "Exmet" and designated as 5Zn9 3/0 has been employed successfully. Under the designation above, the expanded metal grid had a web thickness in finished form of .009 inch and its mesh designation (size) was 3/0. The original stock thickness was 0.005 inch prior to fabrication of the expanded metal. Generally, any expanded zinc metal having a mesh size of between 2/0 and 6/0 may be used in the practice of the invention.

For most applications, amalgamation of the zinc metal is preferred. Generally speaking, an amalgamation level of between about 1 percent and 8 percent by weight of mercury is satisfactory. The amalgamation of the zinc may be carried out by impregnating the anode compact with a solution of a mercury salt.

Early experiments conducted with extended area anode compacts made from various types of zinc fibers and fabricated metal have demonstrated the general electrochemical equivalence between most all of the forms of zinc metal tested. In one particular series of tests, a wide variety of zinc forms were used to make anode compacts for use in a typical oxygen-zinc cell. Despite the fact that the surface area of these different types of zinc forms varied considerably over a wide range of values, they exhibited a nearly equal electrochemical performance when discharged at a current density of 250 amperes per square foot of nominal surface area. Thus, for example, an anode compact made by compression molding electrolytically produced zinc fibers having a real surface area of about 4000 square centimeters per gram was operated at an electrode coulometric efficiency of about 80 percent whereas an equal performance was exhibited by an anode metal having a calculated real surface area of only about 26 square centimeters per gram. Table I below summarizes the results of these tests and includes data on other forms of zinc employed.

TABLE I

| Form of Zn metal | Density of anode compact,[1] grams/cc. | Real surface area, cm.$^2$/gram | Average volts at 250 amp/sq. ft. discharge | Zn coulometric efficiency, percent |
|---|---|---|---|---|
| Lathe cuttings [2] | 1.9 | 250 | 0.88 | 65 |
| Shaper cuttings [2] | 1.7 | 300 | 0.92 | 80 |
| Saw cuttings [2] | 1.9 | 300 | 0.88 | 74 |
| Mill cuttings [2] | 1.7 | 250 | 0.90 | 82 |
| Electrolytic dendrites [2] | 1.7 | 4,000 | 0.90 | 80 |
| Expanded Zn sheet | 1.7 | [3] 26 | 0.90 | 83 |
| Zn screen | 1.7 | [3] 32 | 0.90 | 75 |
| Zn powder (No. 1205) | 2.5 | 200 | 0.78 | 41 |

[1] Density values based on total volume of anode compact including volume of carrier material if used.
[2] Zn mesh envelope.
[3] Calculated surface area.

In subsequent tests using zinc fibers having different fiber length, diameters and stiffness, it was found that the fixed molding pressure employed to form the anode compact yielded higher or lower bulk densities depending on the particular type of fiber. It was also found that the behavior of the anode compact in terms of electrode efficiency varied widely from good to very poor performance.

It has now been discovered in accordance with the invention that the most significant factor controlling the more or less equivalent electrochemical behavior of the different forms of zinc metal having different surface area is that of apparent density or bulk density of the formed anode compact. Experiments have thus shown that for any given form of zinc metal, whether it be fibrous zinc or expanded zinc metal, for example, the electrode coulometric efficiency of the anode compact will generally increase from a low percentage at high bulk densities of the order of about 2.5 grams per cubic centimeter to higher electrode efficiencies as the bulk density is decreased.

From the standpoint of attaining reasonably high electrode efficiencies of about 70 percent of theoretical and above at electrical current drains of about 250 amperes per square foot, it has been found that the bulk density of the formed anode compact should be maintained within the range of from about 1 to 1.75 and preferably from about 1 to 1.50 grams per cubic centimeter. Electrode efficiencies of from about 80 to 85 percent may be obtained when the bulk density is maintained within the range of from 1 to 1.25 grams per cubic centimeter. At high electrical current drains of about 400 amperes per square foot, electrode efficiencies approaching 70 percent of theoretical may be obtained if the bulk density of the anode compact is maintained within the range of from about 1 to 1.50 grams per cubic centimeter. With anode compacts of a low bulk density below about 1 gram per cubic centimeter, the higher electrode efficiency obtained is considerably offset by increased electrode thickness and by the increased voltage drop caused by the greater average electrode spacing that is required within the cell.

While the exact mechanism by which improved electrode coulometric efficiency is obtained in accordance with the invention is not entirely understood, it is believed that the increase of void volume achieved by compacting the zinc fibers and/or fabricated metal to a controlled lower bulk density has the effect of allowing the electrolyte to more readily penetrate and pass into the pores of the anode compact and thus come into contact with a greater portion of the active zinc surface, and further that the increase of void volume affords additional space for the formation of zinc oxides which normally form as a by-product of the electrochemical reaction. It is believed that with anode compacts of high bulk densities, there is a tendency for the zinc fibers to be forced apart by the formation of the zinc oxides, thus resulting in loss of electrical contact and poor conductivity.

To illustrate the advantages derived from employing a low bulk density in the formed anode compact of the invention, a number of high rate oxygen-zinc cells of a construction similar to that shown in FIG. 2 and employing anode compacts made from expanded zinc metal were constructed and tested. The cells were identical in construction except for the anode compacts which were formed by compression molding the expanded zinc metal to various bulk densities ranging from about 2.5 to 1 gram per cubic centimeter. The amount of active material, i.e., zinc metal, and the total active surface area (real) were approximately the same for each one of the anode compacts employed. In the test the cells were discharged at a current density of 250 and 400 amperes per square foot of nominal anode surface area and the electrode coulometric efficiency was then calculated from the data obtained. The results of the test are shown in Table II.

TABLE II

| Density of anode compact grams/cc. | Anode thickness, inch | Life in minutes | | Watt-hr./cell | | Zn coulometric efficiency | |
|---|---|---|---|---|---|---|---|
| | | 250 amp/ sq. ft. | 400 amp/ sq. ft. | 250 amp/ sq. ft. | 400 amp/ sq. ft. | 250 amp/ sq. ft. | 400 amp/ sq. ft. |
| 2.50 | 0.053 | 27 | 16 | 5.18 | 4.14 | 40.5 | 38.4 |
| 2.25 | 0.059 | 28 | 16 | 5.71 | 4.21 | 42.0 | 38.4 |
| 2.00 | 0.066 | 40 | 21 | 7.63 | 5.90 | 60.0 | 51.6 |
| 1.75 | 0.075 | 47 | 26 | 0.05 | 7.78 | 70.5 | 62.1 |
| 1.50 | 0.088 | 49 | 27 | 10.65 | 8.05 | 73.5 | 65.7 |
| 1.25 | 0.105 | 54 | 32 | 11.85 | 10.19 | 81.0 | 77.7 |
| 1.00 | 0.131 | 56 | 34 | 12.7 | 10.80 | 83.9 | 82.7 |

From the above data it will be seen that a significant improvement in cell performance is obtained as the bulk density of the formed anode compact is lowered from about 2.5 grams per cubic centimeter. Reasonably high electrode efficiencies of above about 70% are attained at electrical current drains of 250 amperes per square foot when the bulk density is lowered to 1.75 grams per cubic centimeter and nearly equivalent electrode efficiencies of 65% are achieved at higher electrical current drains of 400 amperes per square foot if the bulk density is reduced to 1.5 grams per cubic centimeter. An optimum efficiency is reached when the bulk density is maintained within the range of from 1 to 1.25 grams per cubic centimeter. This is clearly evidenced by the fact that more than a two-fold improvement in electrode efficiency was obtained with the anode compact having a low bulk density of 1.0 gram per cubic centimeter as compared to the anode compact employing a high bulk density of about 2.5 grams per cubic centimeter.

Figure 10:
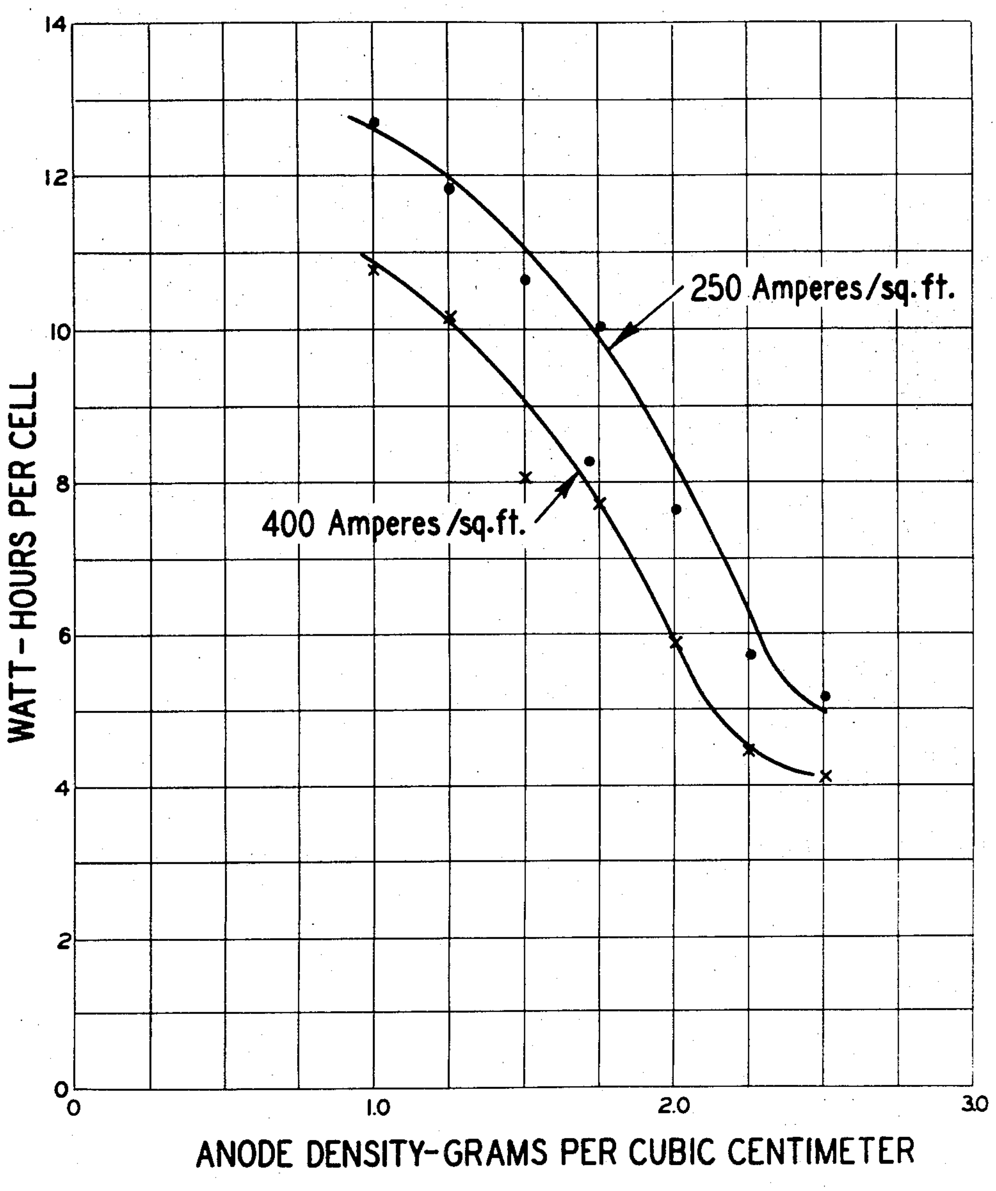
FIG. 10 is a graph illustrating the effects of bulk density on the performance of an extended area anode compact of the invention.
Figure 11:
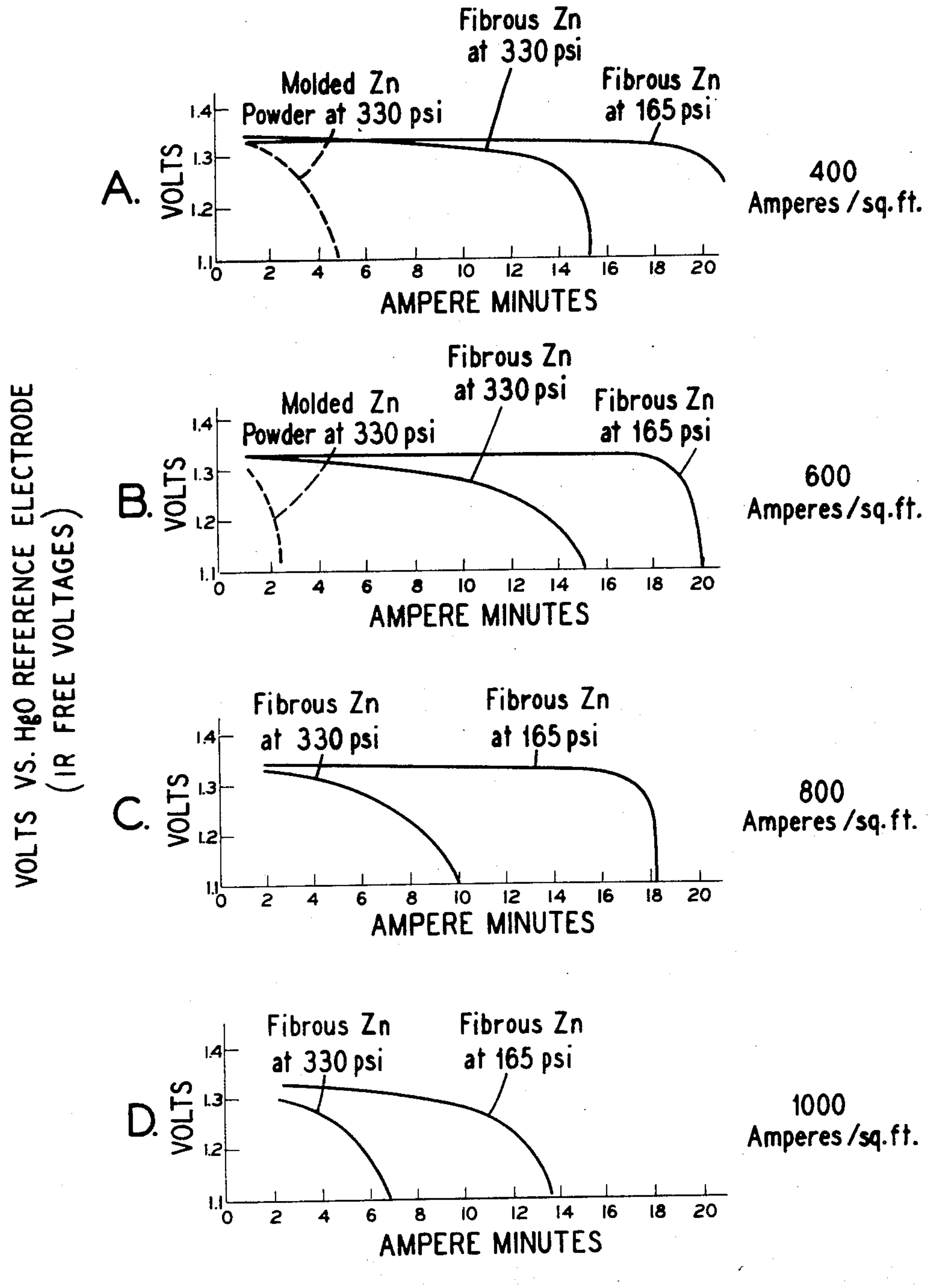
FIGS. 11A–11D are curves representing the performance of the extended area anode compact against a standard reference electrode when employed at different current densities within an alkaline electrolyte.

FIG. 10 is a graphic representation of the data taken from the above test. The graph clearly illustrates the significant improvement in cell performance that is attained by forming the anode compact at controlled low bulk densities as expressed in terms of total watt-hours of service obtained from the cells.

It will be evident from the foregoing and especially the data given in Table II that the thickness of the anode compact will be increased when a low bulk density is employed. Heretofore when forming extended area anodes by conventional pressed powder techniques, it was generally agreed that the electrode thickness would be maintained as thin as possible in order to achieve a high volumetric efficiency within the finished cell. Despite this fact, it has now been discovered that the thickness of an anode compact made in accordance with the invention may be considerably increased in order to attain the desired low bulk density, and that the advantages of improved cell performance derived from the use of low bulk density anode compacts more than offsets the decrease of volumetric efficiency within the cell. Nonetheless, the thickness of the anode compact should be kept within practical limits and generally may range from about 0.020 to about 0.5 inch in thickness. With thicker anode compacts, the information of zinc oxides within the outer pores tends to impede ion transfer and thus decrease the operating current density of the cell.

As indicated above, the oxygen-zinc cell employing an anode compact in accordance with the invention uses an alkaline electrolyte solution suitably of potassium or sodium hydroxide. The concentration of the alkaline electrolyte should be maintained within a range of about 9–14 normal in order to obtain maximum high current performance from the zinc anode of the invention. At concentrations of 8 normal and below, the oxidation product formed on the anode in this environment tends to be a dark tightly-adherent material which causes the anode to polarize and eventually completely impedes the anode reaction. At concentrations of 9–14 normal and preferably 10 normal, the anode product which forms after the electrolyte has become saturated with soluble zinc is a light-colored, porous, loosely-adherent material which readily separates from the underlying anode metal and thereby permits continued anode function until normal cell exhaustion is attained.

To further demonstrate the effectiveness of the invention, another series of polarization tests was conducted with half cells using mercuric oxide reference electrodes and employing several different types of zinc anodes. Some of the cells employed an anode compact formed by compression molding electrolytic dendrite fibers at different pressures, i.e., 165 p.s.i. and 330 p.s.i. Other cells used anodes formed by compressing zinc powder at 330 p.s.i. The cells were identical except for the particular type of anode used. The anodes were discharged at various current densities ranging from about 400 amps/ft.$^2$ to about 1000 amps/ft.$^2$.

FIGS. 11A through 11D are graphic representations of the results of these tests. It will be readily seen from the several curves shown on the graphs which illustrate the typical discharge characteristics of the different types of anodes, that the anode compacts formed from zinc fibers compression molded under lower pressure, and hence having a lower bulk density, outperformed those anode compacts of zinc fibers formed under higher pressure, and further that a significant improvement in performance over that of pressed powder zinc anodes was attained.

By way of further illustrating the superior performance of anodes of the invention, another series of tests were conducted with oxygen-zinc cells employing an alkaline electrolyte and anode compacts made of expanded zinc metal or electrolytic zinc fibers enclosed in an outer expanded zinc sheath. All of the anode compacts had a bulk density of about 1.5 grams/cc. The results of these tests are given below in Table III.

TABLE III.—OXYGEN-ZINC CELL SYSTEM CAPABILITY AT HIGH CURRENT DENSITY

| Current density (amps/sq. ft., nominal) | 240 | 400 | 600 | 800 | 1,000 | 1,200 | 1,400 |
|---|---|---|---|---|---|---|---|
| Average volt | 0.969 | 0.896 | 0.809 | 0.748 | 0.690 | 0.651 | 0.582 |
| Amp. on 1.8 in.$^2$ | 3.0 | 5.0 | 7.5 | 10.0 | 12.5 | 15.0 | 17.5 |
| Watts | 2.91 | 4.48 | 6.07 | 7.48 | 8.63 | 9.77 | 10.18 |
| Watt-hours | 1.36 | 1.19 | 0.96 | 0.75 | 0.65 | 0.65 | 0.51 |
| Minutes of life | 28.0 | 16.0 | 9.5 | 6.0 | 4.5 | 4.0 | 3.5 |
| Amp-min | 84.0 | 80.0 | 71.3 | 60.0 | 56.2 | 60.0 | 52.5 |
| Zinc efficiency, percent [1] | 79.0 | 75.7 | 67.0 | 56.8 | 53.2 | 56.8 | 49.3 |

[1] 2.15 g. zinc anode provides 105.7 amp-min. of theoretical capacity.

Of particular note in the above table, last column, is a cell provided with an anode compact having 1.8 square inches nominal electrode surface area which was operated at 17.5 amperes (equivalent to 1400 amperes per square foot of anode surface) and which ran for three and one-half minutes at an average voltage of 0.582 volt with an anode coulometric efficiency of 49.3 percent. The cell had a thickness of only 0.092 inch and yet yielded a power output of over 10 watts, representing a significant improvement over prior cells of its type known in the art.

It has been further found in accordance with the invention that there is a significant temperature dependence in the performance of the zinc anode compact when used in an oxygen-zinc cell. Experimentation has shown that when the internal temperature of the cell is maintained essentially constant instead of permitting the temperature to rise in the usual fashion due to the normal heat of reaction, the cell will not operate at high current densities until the internal temperature is allowed to reach a certain minimum level. As one example, it has been demonstrated that an oxygen-zinc cell utilizing a fibrous zinc anode compact could not be successfully discharged at a current density of 400 amps/ft.$^2$ below a temperature of about 45° C. The anode was found to be the limiting electrode in the low temperature range.

Although the exact reason for this effect of temperature on the anode performance is not clearly understood, it is believed due to an increase in the degree of zinc oxide saturation within the electrolyte which can be achieved electrochemically above the level of chemical saturation of the solution with zinc oxide (the initial condition of the electrolyte). During this period of saturation and supersaturation where the anode corrosion product is still soluble, the zinc anode will function at high current density and low temperature. If, during this period, the cell is sufficiently well insulated to permit its internal temperature to rise, the cell will continue to operate with good anode efficiency, even when the limit of electrochemical saturation of the electrolyte solution with zinc oxide occurs, and a precipitate is formed. Thus, it is believed that the temperature dependence of these cells may be related to two factors: (1) more zinc can be dissolved in the solution at high temperatures, and/or (2) the zinc oxide precipitate which forms at higher temperatures on electrochemical saturation of the solution may be of a different structure and may be more easily sloughed off the surface of the zinc anode.

In order to further demonstrate the effect of temperature on the performance of the zinc anodes, a series of tests were conducted using cells employing anode compacts of both zinc fibers and expanded zinc mesh. The anode compacts were formed to a low bulk density of about 1.2 grams per cubic centimeter. The fibrous zinc anodes had a real surface area of approximately 2000 cm.$^2$/gm. and the anode compacts made from expanded zinc mesh had a calculated surface area of about 200 cm.$^2$/gm. The cells were identical in construction except for the anode compacts used and employed in 10 N solution of KOH as the electrolyte. During the tests, the cells were discharged while immersed within a water bath in order to prevent the internal temperature from rising as the normal heat of reaction was released within the cell.

Figure 12:
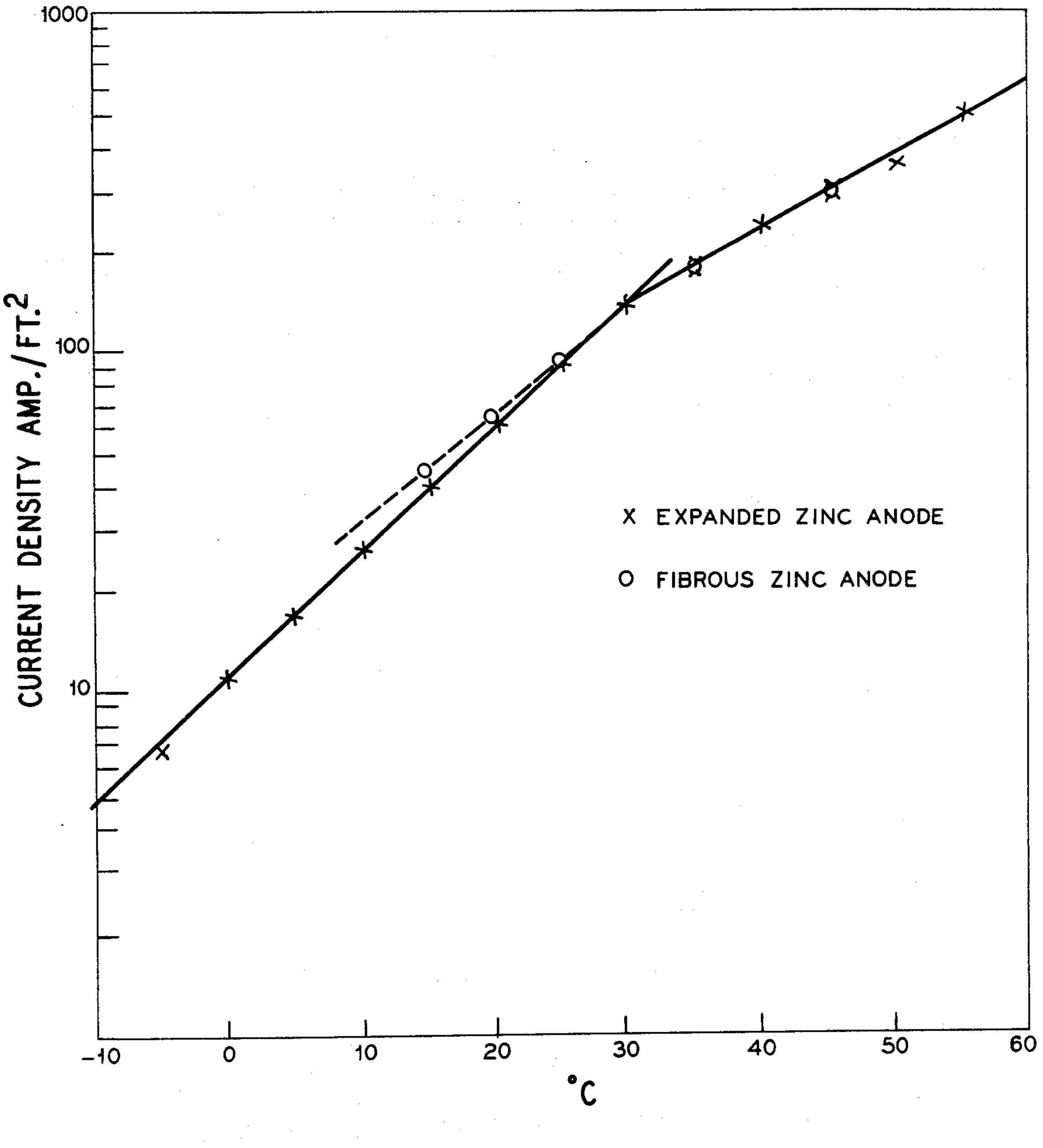
FIG. 12 is a graph illustrating the temperature dependence of the extended area anode compact with increasing current density.

FIG. 12 is a graphic representation of the data obtained from these tests. As shown in the graph, the logarithm of the maximum current density obtainable from the cell plotted against the temperature at which the cell is discharged shows a linear relationship. Moreover, it was surprisingly found that this temperature effect was essentially linear over two separate temperature ranges under the test conditions above and below approximately 25° C. Within the lower temperature range below about 25° C., there was furthermore observed a slight increase in the performance or current output of the higher surface area fibrous zinc anodes while in the upper temperature range, substantially no benefit in performance was observed for anodes of fibrous zinc over those made from expanded zinc mesh. Although not shown in the graph, the fibrous zinc anodes did not perform quite as well which is attributable to the poorer interfiber contact of these anodes as compared to the zinc mesh anodes.

In a practical oxygen-zinc cell constructed in accordance with the invention, suitable means should be provided for maintaining the internal temperature of the cell at least at the minimum operating temperature required for the particular current density at which the cell is to be discharged. Such means may include for example, a body of heat insulating material surrounding the cell proper which will permit the internal temperature to rise to the required level by virtue of the normal heat of reaction generated within the cell on discharge.

What is claimed is:

1. For use in an alkaline galvanic cell, an extended area anode compact comprising randomly orientated, elongated forms of zinc in intimate pressure-formed multipoint physical contact with one another throughout the body of said anode compact, said anode compact having a bulk density of between about 1 and 1.5 grams per cubic centimeter.

2. Extended area anode compact as defined by claim 1 wherein the bulk density is between about 1 and 1.25 grams per cubic centimeter.

3. Extended area anode compact as defined by claim 1 wherein the elongated zinc forms are zinc fibers.

4. Extended area anode compact as defined by claim 1 wherein the elongated zinc forms are selected from the group consisting of expanded zinc metal and zinc screen.

5. Extended area anode compact as defined by claim 3 wherein the zinc fibers are supported on a carrier grid of expanded zinc metal.

6. Extended area anode compact as defined by claim 3 wherein the zinc fibers are enveloped within an outer sheath of expanded zinc metal.

7. For use in an alkaline galvanic cell, an extended area anode compact comprising randomly oriented, entangled zinc fibers in pressure-formed multipoint physical contact with one another, said zinc fibers being enveloped within an outer sheath of expanded zinc metal, the bulk density of said anode compact being between about 1 and 1.5 grams per cubic centimeter.

8. In a galvanic cell employing an alkaline electrolyte, an extended area zinc anode comprising elongated forms of zinc arranged in random orientation and compacted into a composite, porous anode body, said elongated zinc forms being in intimate, pressure-formed multipoint physical contact with one another throughout said body, said anode compact having a bulk density of between about 1 to 1.25 grams per cubic centimeter.

9. The galvanic cell as defined by claim 8 wherein the concentration of the alkaline electrolyte is between about 9 and 14 normal.

10. In an alkaline galvanic cell having a zinc anode, and activated and catalyzed, oxygen-depolarizable carbon cathode, a separator therebetween, and an alkaline electrolyte; the improvement whereby maximum anode coulometric efficiency is attained within said cell, said improvement comprising an extended area anode compact composed of randomly orientated, elongated forms of zinc in intimate, pressure-formed multipoint physical contact throughout the body of said anode compact, said elongated zinc forms being selected from the group consisting of zinc fibers and expanded zinc metal, said anode compact having a bulk density of between about 1 and 1.5 grams per cubic centimeter.

11. The galvanic cell as defined by claim 10 wherein the elongated forms of zinc are amalgamated with between about 1 and 8 percent by weight of mercury.

12. The galvanic cell as defined by claim 10 wherein the concentration of the alkaline electrolyte is between about 9 and 14 normal.

13. A high rate alkaline galvanic cell comprising an extended area zinc anode compact, an activated and catalyzed, oxygen-depolarizable carbon cathode and an alkaline electrolyte in contact with said anode compact and said cathode, said anode compact being composed of randomly oriented, elongated forms of zinc in intimate pressure-formed multipoint physical contact with one another throughout the body of said anode, said anode compact having a bulk density of between about 1 and 1.5 grams per cubic centimeter, and means for maintaining the internal temperature of said cell at least at a minimum temperature required to discharge said cell at high current densities.

14. The galvanic cell as defined by claim 13 wherein the anode compact is composed of zinc fibers in pressure-formed multipoint physical contact with one another, the anode compact having a bulk density of between about 1 and 1.25 grams per cubic centimeter.

15. The galvanic cell as defined by claim 13 wherein the anode compact is composed of at least two sheets of expanded zinc metal superimposed upon one another in random orientation and in intimate pressure-formed multipoint physical contact, the anode compact having a bulk density of between about 1 and 1.5 grams per cubic centimeter.

16. For use in an alkaline galvanic cell, an extended area anode compact comprising at least two sheets of expanded zinc metal superimposed upon one another in random orientation and in intimate pressure-formed multipoint physical contact, said anode compact having a bulk density of between about 1 and 1.75 grams per cubic centimeter.

References Cited

UNITED STATES PATENTS

| | | | |
|---|---|---|---|
| 1,797,374 | 3/1931 | Smith | 136—161.1 |
| 2,636,059 | 4/1953 | Garine | 136—30 |
| 2,689,322 | 9/1954 | Godshalk et al. | 136—161.1 |
| 2,810,008 | 10/1957 | Bikerman. | |
| 2,903,497 | 9/1959 | Comanor. | |
| 3,069,486 | 12/1962 | Solomon et al. | 136—30 |
| 3,071,638 | 1/1963 | Clark et al. | 136—125 |
| 3,087,003 | 4/1963 | Drengler et al. | |
| 3,288,651 | 11/1966 | Linton | 136—125 |
| 3,305,401 | 2/1967 | Aulin. | |
| 3,335,031 | 8/1967 | Kordesch | 136—125 |
| 3,376,166 | 2/1968 | Hruden | 136—125 |

WINSTON A. DOUGLAS, Primary Examiner

C. F. LEFEVOUR, Assistant Examiner

U.S. Cl. X.R.

136—125

UNITED STATES PATENT OFFICE
CERTIFICATE OF CORRECTION

Patent No. 3,672,998 Issue Date June 27, 1972

Inventor(s) William G. Darland, Jr.

It is certified that error appears in the above-identified patent and that said Letters Patent are hereby corrected as shown below:

n the Specification:

Column 3, line 34, the word "greater" should be changed to --grater--.

Column 5, line 70, the word "mtny" should be changed to --many--.

Column 8, Table II, line 48, under the headings "Watt-hr./cell" and "250 amp/sq. ft.", fourth digit, the numeral "0.05" should be changed to --10.05--.

Signed and sealed this 13th day of November 1973.

(SEAL)
Attest:

EDWARD M.FLETCHER,JR.
Attesting Officer

RENE D. TEGTMEYER
Acting Commissioner of Patents

Pat 212:4.72